United States Patent
Liu et al.

(10) Patent No.: US 12,301,595 B2
(45) Date of Patent: *May 13, 2025

(54) PREDICTIVE DNS CACHE TO IMPROVE SECURITY AND PERFORMANCE

(71) Applicant: Palo Alto Networks, Inc., Santa Clara, CA (US)

(72) Inventors: Daiping Liu, Sunnyvale, CA (US); Jun Wang, Fremont, CA (US); Wei Xu, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,541

(22) Filed: May 21, 2024

(65) Prior Publication Data

US 2024/0314144 A1    Sep. 19, 2024

Related U.S. Application Data

(63) Continuation of application No. 17/511,390, filed on Oct. 26, 2021, now Pat. No. 12,028,354.

(51) Int. Cl.
*H04L 29/06* (2006.01)
*G06N 20/00* (2019.01)
(Continued)

(52) U.S. Cl.
CPC ......... *H04L 63/1416* (2013.01); *G06N 20/00* (2019.01); *H04L 61/4511* (2022.05);
(Continued)

(58) Field of Classification Search
CPC . H04L 63/1416; H04L 61/4511; H04L 61/58; H04L 63/0236; H04L 63/1425; H04L 63/20; H04L 63/1458; G06N 20/00
See application file for complete search history.

(56) References Cited

U.S. PATENT DOCUMENTS 7,343,397 B2     3/2008  Kochanski
11,153,330 B1 * 10/2021  Antoniewicz ....... H04L 61/4511
(Continued)

FOREIGN PATENT DOCUMENTS

CN      111885216     11/2020
CN      111901319     11/2020
(Continued)

OTHER PUBLICATIONS

Cohen et al. Proactive Caching of DNS Records: Addressing a Performance Bottleneck. Published Jan. 8, 2001. Computer Science. Proceedings 2001 Symposium on Applications and the Internet.
(Continued)

*Primary Examiner* — William A Corum, Jr.
(74) *Attorney, Agent, or Firm* — Van Pelt, Yi & James LLP

(57) ABSTRACT

The present application discloses a method, system, and computer system for predicting responses to DNS queries. The method includes receiving a DNS query comprising a subdomain portion and a root domain portion from a client device, determining whether to obtain target address information corresponding to the DNS from a predictive cache, in response to determining to obtain the target address information from the predictive cache, obtaining the target address information from the predictive cache, and providing the target address information to the client device.

17 Claims, 9 Drawing Sheets

(51) Int. Cl.
*H04L 9/40* (2022.01)
*H04L 61/4511* (2022.01)
*H04L 61/58* (2022.01)

(52) U.S. Cl.
CPC .......... *H04L 61/58* (2022.05); *H04L 63/0236* (2013.01); *H04L 63/1425* (2013.01); *H04L 63/20* (2013.01)

(56) References Cited

U.S. PATENT DOCUMENTS

| | | |
|---|---|---|
| 2003/0187746 A1 | 10/2003 | Kochanski |
| 2006/0112176 A1 | 5/2006 | Liu |
| 2016/0065611 A1 | 3/2016 | Fakeri-Tabrizi |
| 2016/0294773 A1 | 10/2016 | Yu |
| 2016/0294859 A1 | 10/2016 | Choi |
| 2016/0359887 A1 | 12/2016 | Yadav |
| 2018/0278633 A1 | 9/2018 | Brutzkus |
| 2018/0351974 A1 | 12/2018 | Baughman |
| 2019/0164071 A1 | 5/2019 | Paugh |
| 2022/0294757 A1* | 9/2022 | Khasanova ......... H04L 61/4511 |
| 2022/0400099 A1 | 12/2022 | Feldpusch |
| 2022/0407870 A1* | 12/2022 | Vega ................... H04L 61/4511 |
| 2023/0291715 A1 | 9/2023 | Barnett |

FOREIGN PATENT DOCUMENTS

| | | |
|---|---|---|
| CN | 111935136 | 11/2020 |
| WO | 2008112770 | 9/2008 |
| WO | 2010027794 | 3/2010 |

OTHER PUBLICATIONS

DNS Prefetching, https://web.archive.org/web/20210123084953/https://www.chromium.org/developers/design-documents/dns-prefetching. Jan. 23, 2021.

Krishnan et al. DNS Prefetching and Its Privacy Implications: When Good Things Go Bad. LEET ' 2010.

* cited by examiner

PREDICTIVE DNS CACHE TO IMPROVE SECURITY AND PERFORMANCE

CROSS REFERENCE TO OTHER APPLICATIONS

This application is a continuation of U.S. patent application Ser. No. 17/511,390, entitled PREDICTIVE DNS CACHE TO IMPROVE SECURITY AND PERFORMANCE filed Oct. 26, 2021 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

Figure 1:
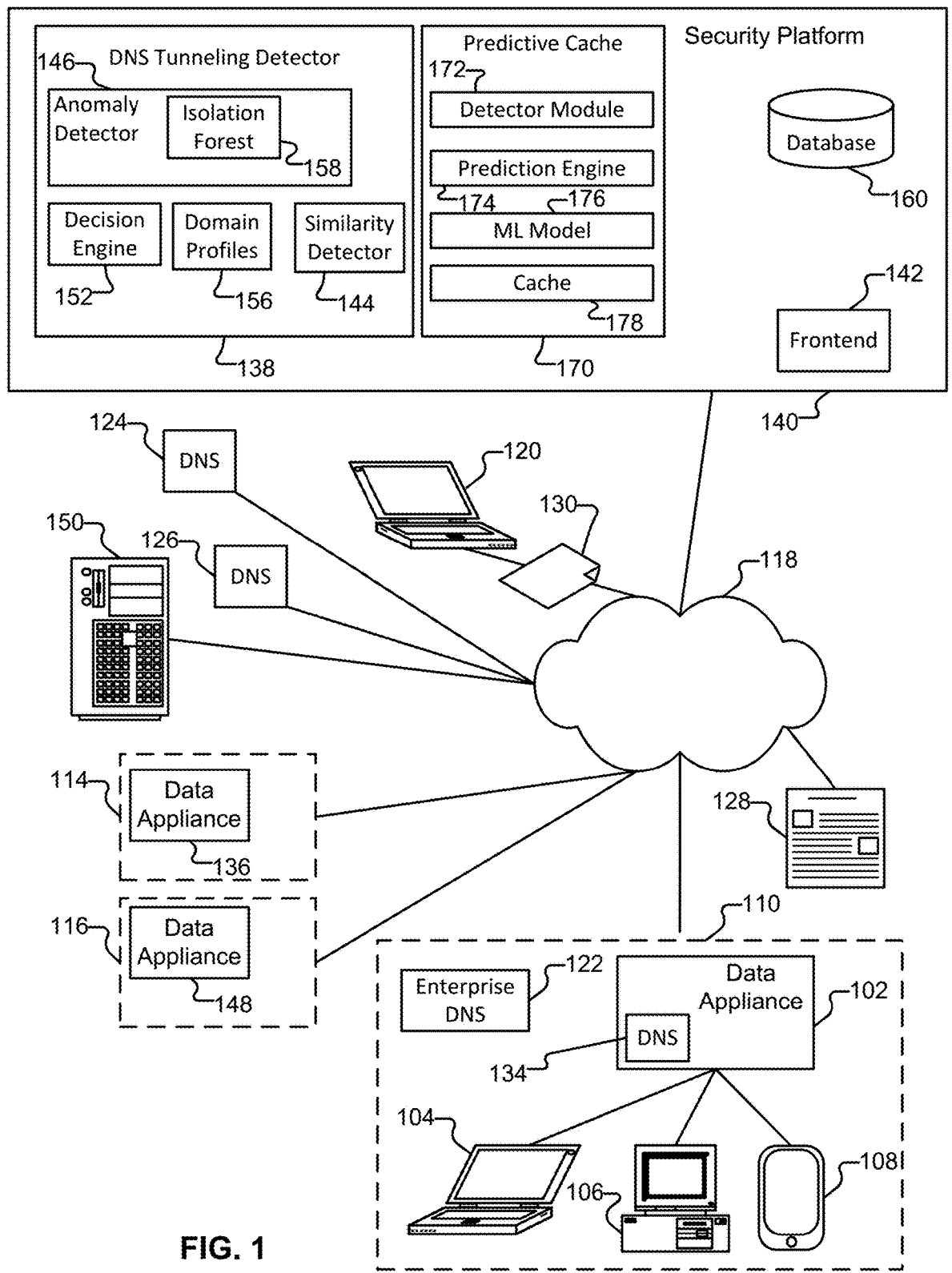
FIG. 1 illustrates an example of an environment in which malware is detected or suspected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for predicting target address information responsive to Domain Name System (DNS) queries is disclosed. The system comprises one or more processors and a memory. The one or more processors are configured to receive a DNS query, determine whether to obtain target address information corresponding to the DNS query from a predictive cache, in response to determining to obtain the target address information from the predictive cache, obtain the target address information from the predictive cache, and provide the target address information to the client device.

DNS tunneling is a popular for attackers for data exfiltration because most networks general allow DNS traffic and do not provide secure control over DNS traffic. Controlling DNS traffic is difficult because most DNS traffic is generally benign and the traffic patterns of DNS traffic is diverse. For example, systems generally do not provide a mechanism to prevent malicious slow tunneling such as the use of many queries that each includes a small amount of malicious information (e.g., on the order of 1 byte) but that in aggregate provide a lot of malicious information. Queries from a malicious client (e.g., an infected client) are generally communicated in an encoded stream. Further, the address information responsive to queries is often not stored in a legacy cache, and in response to a determination that a legacy cache does not store such address information, the data is forwarded to an authoritative nameserver. Causing the malicious traffic to be forwarded to the authoritative nameserver is generally the intent of the malicious parties behind the attack. Conversely, a benign client that communicates a DNS query does not care how the responsive information is generated or from where such information is obtained. Rather, a benign client merely desires a timely response including accurate address information (e.g., an IP address). Various embodiments implement a predictive cache that estimates/predicts information responsive to a DNS query to limit or eliminate the need for queries to authoritative nameservers to resolve address information for a DNS query. The use of the predictive cache thus prevents malicious traffic from being forwarded to authoritative nameservers, and provides timely and accurate information in response to benign DNS queries.

According to various embodiments, a system and/or method for determining a response to a DNS query is provided. In some embodiments, the system determines to a response to a received DNS query using a predictive cache. For example, the system determines a target address information (e.g., address information estimated to be responsive to the DNS query) without accessing (e.g. querying) an authoritative nameserver (e.g., an aDNS) for the domain comprised in the DNS query. In response to a determination that a response to a DNS query is to be generated (e.g., address information responsive to the DNS query is to be estimated) using a predictive cache rather than a legacy cache or query to an authoritative nameserver, the predictive cache determines target address information corresponding to the DNS query. In some embodiments, the predictive cache stores predicted address information (e.g., predicted sub-domains for a various domains). In some embodiments, the predictive cache determines the target address information (e.g., a predicted address information responsive to the DNS query) contemporaneous with the DNS request. For example, in response to a determination that the predictive cache is to be used in connection with generating a response to a DNS query, the predictive cache obtains one or more records associated with a domain comprised in the DNS query, provides the one or more records to a model (e.g., a machine learning model), and obtains (e.g., determines) a target address information corresponding to the DNS query. As an example, the target address information comprises an estimated address information for the particular domain included in the DNS query. In some embodiments, the one or more records associated with a domain are records pertaining to a plurality of subdomains for a particular top-level domain such as a top-level domain of the domain comprised in the DNS query.

In some embodiments, the system obtains one or more records associated with a domain comprised in the DNS query based at least in part on determining a set of domains associated with a top-level domain corresponding to the domain comprised in the DNS query. As an example, the determining the set of domains associated with the top-level domain comprises determining a set of lexically similar domains to a particular domain. For example, if the particular domain is "abc.root.com", the set of domains may be determined to include: "dbc.root.com", "aec.root.com", etc. In response to determining the set of domains, the system queries the authoritative nameserver for address information pertaining to the set of domains. As an example, a domain is deemed to be similar (e.g., lexically similar) to a particular domain, based on a determination (e.g., computation) of a value indicating a degree of similarity, and a determination that the value indicating the degree of similarity is greater than a predefined similarity threshold. In response to receiving the address information pertaining to the set of domains (e.g., from the aDNS), the system uses such address information to predict target address information for the domain comprised in the DNS query. For example, the system provides the address information for the set of domains to a model (e.g., a machine learning model), and uses the model to estimate the address information that is responsive to the DNS query. As an example, the model uses a relationship and/or pattern of address information among the set of domains and/or a training set to estimate the address information that is responsive to the DNS query.

Various embodiments determine whether to use a predictive cache in connection with a DNS query based at least in part on a determination whether the DNS query corresponds to suspicious traffic (e.g., the DNS query is suspicious or the device from which the DNS query is received is suspicious). In some embodiments, the system uses a detector module to detect (e.g., determine) whether the DNS query is suspicious. For example, the detector module performs a real-time detection of whether traffic is suspicious. An example of a system, method, and/or device used in connection with analyzing traffic and/or determining whether traffic is suspicious is provided in U.S. patent application Ser. No. 16/799,655 corresponding to U.S. Patent Application Publication No. 2021/0266293. U.S. patent application Ser. No. 16/799,655 is incorporated by reference in its entirety. According to various embodiments, in response to a determination that the traffic (e.g., the DNS query) corresponds to suspicious traffic, the system determines to use the predictive cache in connection with determining target address information (address information that is responsive to the DNS query). Conversely, in response to a determination that the traffic does not correspond to suspicious traffic, the system determines to use a legacy cache or to query an applicable authoritative for the corresponding target address information. In some embodiments, the detector module is configurable. For example, an administrator can configure the detector module based on a desired sensitivity or in response to a determination that an undesired level of traffic is improperly deemed suspicious traffic (e.g., a percentage of genuine traffic that is determined to be suspicious exceeds a traffic threshold).

According to various embodiments, a system and/or method for using a model (e.g., a machine learning model) to estimate (e.g., predict) a structure of a domain and/or target address information responsive to a DNS query. For example, a predictive cache may implement a machine learning model in connection with determining the target address information. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc. In some embodiments, the model used in connection with estimating address information for a domain is trained using a set of training domains. The set of training domains may be pre-set. For example, the set of training domains may comprises a set of pre-selected domains deemed to be benign (e.g., google.com, etc.). According to various embodiments, using the model to estimate the address information comprises obtaining records for subdomains for a domain associated with the DNS query (e.g., a top-level domain for the particular domain being queried), obtaining records for the set of training domains (e.g., records for the top-level domain and one or more subdomains), querying a corresponding authoritative nameserver for a list of similar domains or sub-domains relative to the particular domain comprised in the DNS query), and use a machine learning process to generate the model to estimate the address information responsive to the DNS query (e.g., to determine the target address information). In some embodiments, the model is implemented on a remote server. For example, one or more remote servers implement a machine learning model that services one or more predictive caches. In response to a determination that a model is to be used to generate an estimate of address information for a domain, a predictive cache can query the remote server (e.g., on which the machine learning model is implemented) for the estimate (e.g., the predicted address information for the domain).

The predictive cache can be implemented at various locations on a network. For example, the predictive cache can be deployed on a DNS resolver. As another example, the predictive cache is deployed on a firewall. As another example, the predictive cache is a service that is provided to the DNS resolver (e.g., the predictive cache is deployed on a remote server that services queries from the DNS resolver for predicted address information for domains).

The system improves the handling of DNS traffic (e.g., response to DNS traffic) by preventing (or improving prevention of) malicious traffic from being sent to authoritative nameservers in connection with responding to the DNS traffic. Further, the system can provide accurate and low latency responses to benign DNS traffic. Accordingly, the system prevents proliferation of malicious traffic while providing genuine traffic with the same level of service or better level of service (e.g., if a predictive cache stores target information for a DNS query, querying the authoritative nameserver is not needed).

FIG. 1 illustrates an example of an environment in which malware is detected or suspected and its harm reduced. In the example shown, client devices 104-108 are a laptop computer, a desktop computer, and a tablet (respectively) present in an enterprise network 110 (belonging to the "Acme Company"). Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 110.

Data appliance 102 can be configured to work in cooperation with a remote security platform 140. Security platform 140 can provide a variety of services, including performing static and dynamic analysis on malware samples, and providing a list of signatures of known-malicious files to data appliances, such as data appliance 102 as part of a subscription. In various embodiments, results of analysis (and additional information pertaining to applications, domains, etc.) are stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

According to various embodiments, security platform 140 comprises DNS tunneling detector 138 and/or predictive cache 170. In some embodiments, predictive cache comprises one or more of detector module 172, prediction engine 174, machine learning (ML) model 176, and/or cache 178.

Detector module 172 is used in connection with determining whether to use a predictive cache in connection with a DNS query. In some embodiments, detector module determines whether to obtain a predicted address responsive to the DNS query based at least in part on a determination of whether the DNS query corresponds to suspicious traffic. As example, detector module 172 uses information obtained from DNS tunneling detector in connection with determining whether the DNS query corresponds to suspicious traffic. In some embodiments, detector module 172 determines whether to obtain a predicted address responsive to the DNS query based at least in part on a latency setting corresponding to DNS traffic. The latency setting can be configurable based at least in part on a profile of a user or organization for which DNS traffic is handled (e.g., a latency setting for a customer can be set based at least in part on a level of service to be provided to/contracted with the customer). In implementations according to which a latency for responding to a DNS query is low, then the predictive cache can determine to obtain a predicted address that is responsive to the DNS query (e.g., the target address information) in response to a determination that a legacy cache does not store the target address information. In response to determining that the legacy cache does not store the target address information, detector module determines whether the target address information was previously determined predicted address and/or stored in the predictive cache (e.g., in cache 178). In response to determining that the target address information was not previously determined and/or stored in the predictive cache, detector module 172 determines to obtain the target address information based on predicting the address responsive to the DNS query (e.g., using a machine learning model). For example, detector module 172 requests prediction engine 174 to predict the address responsive to the DNS query. Conversely, in response to determining that the target address information was previously determined by predictive cache and/or is stored in the predictive cache, the previously determined predicted address is used as the target address information.

Prediction engine 174 is used to predict address information corresponding to a domain such as target address information that is responsive to a DNS query. In some embodiments, prediction engine 174 uses a model (e.g., a machine learning model) to accurately predict the address information corresponding to a domain. For example, prediction engine sends a query to machine learning model 176 to obtain target address information corresponding to a domain. In some embodiments, the query to machine learning model 176 comprises one or more of an indication of a domain associated with the DNS query (e.g., a top-level domain), an indication of the requested domain (e.g., a particular subdomain), set of domains associated with the top-level domain corresponding to the DNS query, and/or a set of training domains. In some implementations, machine learning model 176 is pre-trained and prediction 174 does not need to provide a set of training domains to machine learning model 176 contemporaneous with a query for a target address information.

Machine learning model 176 predicts address information corresponding to a particular domain based at least in part on a model. As an example, the model is pre-stored and/or pre-trained. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. According to various embodiments, machine learning model 176 uses a relationship and/or pattern of address information among the set of domains and/or a training set to estimate the address information that is responsive to the DNS query. For example, machine learning model 176 use a machine learning process to analyze a set of relationships between one or more sub-domains and one or more top-level domains comprised in the set of top-level domain information, and uses the set of relationships between one or more sub-domains and one or more top-level domains to generate a prediction model for predicting target address information for a DNS query. In response to predicting the target address information for a DNS query, the predicted target address information is stored in predictive cache 170 such as in cache 178.

Cache 178 stores address information for one or more domains. In some embodiments, cache 178 comprises a legacy cache. For example, the legacy cache stores address information for one or more domains based at least in part on a one or more queries to an applicable authoritative nameserver(s). In some embodiments, cache 178 comprises a cache for predicted addresses. For example, the cache for predicted addresses stores one or more predicted addresses for one or more domains (e.g., predicted addresses responsive to one or more previous DNS queries).

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjqfeuo32ylhkjshdflu23.badsite.com, where the subdomain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Figure 3:
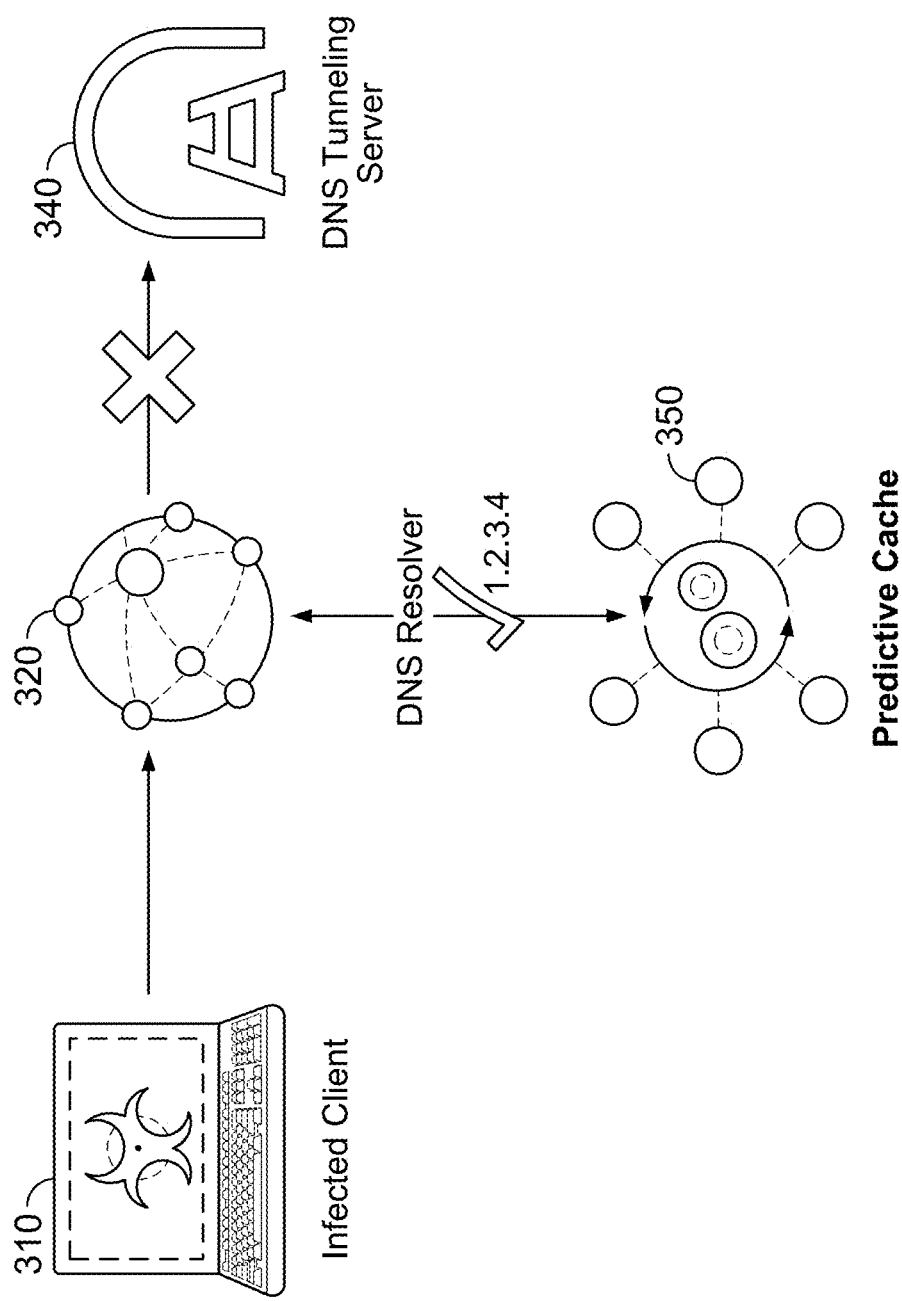
FIG. 3 is a diagram of a system for using a predictive cache in connection with responding to a Domain Name System (DNS) query.

Detecting and preventing DNS tunneling attacks is difficult for a variety of reasons. A first reason is illustrated in FIG. 3 which shows both benign DNS query information (302, 304) and malicious DNS query information (306-312). Many legitimate services (e.g., content delivery networks, web hosting companies, etc.) legitimately use the subdomain portion of a domain name to encode information to help support use of those legitimate services. The encoding patterns used by such legitimate services can vary widely among providers and (as illustrated in FIG. 3) benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious DNS tunneling can efficiently be detected, in real time, and stopped.

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), it provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), they are highly unlikely to be misclassified as malicious tunneling. The following are example characteristics that can be extracted as features (e.g., into a feature vector) for a given group of domains (i.e., sharing a root domain).

Figure 2:
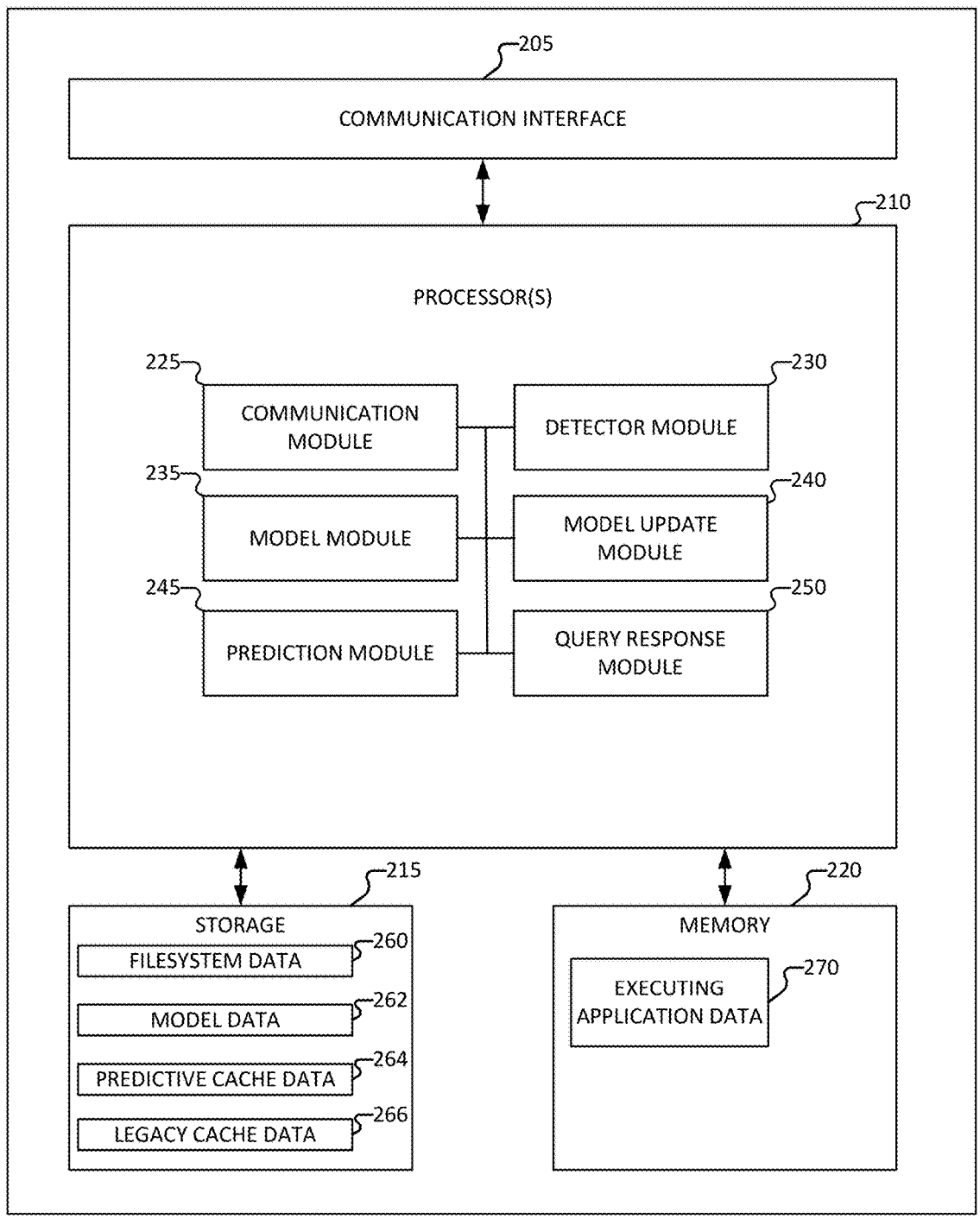
FIG. 2 is a block diagram of a system to provide a predicted address according to various embodiments of the present application.

FIG. 2 is a block diagram of a system to provide a predicted address according to various embodiments of the present application. According to various embodiments, system 200 is implemented in connection with system 100 of FIG. 1, such as for predictive cache 170. In various embodiments, system 200 is implemented in connection with system 300 of FIG. 3, system 400 of FIG. 4, system 500 of FIG. 5, process 600 of FIG. 6, process 700 of FIG. 7, process 800 of FIG. 8, and/or process 900 of FIG. 9.

System 200 can be implemented by one or more devices such as servers. System 200 can be implemented at various locations on a network. For example, the predictive cache can be deployed on a DNS resolver. As another example, the predictive cache is deployed on a firewall. As another example, the predictive cache is a service that is provided to the DNS resolver (e.g., the predictive cache is deployed on a remote server that services queries from the DNS resolver for predicted address information for domains).

In the example shown, system 200 implements one or more modules in connection with predicting an address corresponding to a domain such as for predicting and/or providing target address information in response to a DNS query. System 200 comprises communication interface 205, one or more processors 210, storage 215, and/or memory 220. One or more processors 210 comprises one or more of communication module 225, detector module 230, model module 235, model update module 240, prediction module 245, and/or query response module 250.

In some embodiments, system 200 comprises communication module 225. System 200 uses communication module 225 to communicate with various client terminals or user systems such as an administrator system. For example, communication module 225 provides to communication interface 205 information that is to be communicated. As another example, communication interface 205 provides to communication module 225 information received by system 200. Communication module 225 is configured to receive one or more DNS queries from various client terminals or systems such as firewalls, DNS resolvers, etc. Communication module 225 is configured to receive one or more settings or configurations from an administrator. Examples of the one or more settings or configurations include configurations of a model (e.g., the machine learning model), an indication of a training set for the model, information pertaining to a white list of domains (e.g., domains that are not deemed suspicious and for which queries are permitted to be sent to the applicable aDNS), information pertaining to a black list of domains (e.g., domains that are deemed suspicious and for which a response to the DNS query is to be based at least in part on a predicted address or for which no response to DNS queries is to be provided).

In some embodiments, system 200 comprises detector module 230. System 200 uses detector module 230 in connection with determining whether a DNS query corresponds to suspicious or malicious traffic. In some implementations, detector module 230 corresponds to, or is similar to, detector module 172.

In some embodiments, system 200 comprises model module 235. System 200 uses model module 235 to determine a predicted address for a domain (e.g., a particular domain corresponding to a DNS query). System 200 can manage the model (e.g., the machine learning model) via model module 235. Model module 235 determines a model used to generate predicted addresses based at least in part on a machine learning process and one or more training sets. In some implementations, model module 235 corresponds to, or is similar to, machine learning model 176.

In some embodiments, system 200 comprises model update module 240. System 200 uses model update module 240 to update the model used to predict addresses. Model update module 240 updates the model based at least in part one or more training sessions and/or feedback provided in response to system 200 providing predicted addresses in response to DNS queries. Model update module 240 can be updated using records for one or more domains, such as domains deemed to be benign (e.g., google.com, Microsoft.com, apple.com, etc.). As an example model update module 240 obtains zone file information pertaining to one or more domains (e.g., from a trusted aDNS).

In some embodiments, system 200 comprises prediction module 245. System 200 uses prediction module 245 to predict address information corresponding to a domain such as target address information that is responsive to a DNS query. For example, prediction module 245 determines whether to use model module 235 in connection with predicting a target address information in response to a particular DNS query, and/or to retrieve a previously predicted target address information from cache such as predictive cache data 264. As an example, in response to determining to use model module 235 in connection with predicting the target address information for a DNS query, prediction module 245 sends a query to model module 235 for a predicted address (e.g., for system 200 to provide such predicted address as the target address information in response to the DNS query). In some implementations, prediction module 245 corresponds to, or is similar to, prediction engine 174.

In some embodiments, system 200 comprises query response module 250. System 200 uses query response module 250 to provide target address information in response to a DNS query. For example, query response module 250 obtains a predicted address from prediction module 245 and provides the predicted address as the target address information in response to the DNS query. As another example, query response module 250 provides the target address information to a DNS resolver, a client from which the DNS query originated, etc. As another example, query response module 250 provides target address information for a domain that is obtained from a legacy cache or an aDNS such as in response to system 200 determines that the DNS query is not suspicious or malicious.

According to various embodiments, storage 215 comprises one or more of filesystem data 260, model data 262, predictive cache data 264, and/or legacy cache data 266. Storage 215 comprises a shared storage (e.g., a network storage system) and/or database data, and/or user activity data.

In some embodiments, filesystem data 260 comprises a database such as one or more datasets (e.g., one or more datasets for one or more tenants, etc.). Filesystem data 260 comprises data such as a dataset for training a machine learning process, historical information pertaining DNS queries, a white list of domains deemed to be safe (e.g., not suspicious), a black list of domains corresponding to traffic deemed to be suspicious or malicious, information associated with suspicious or malicious traffic such as trends or relationships, information associated with secure or safe traffic such as trends or relationships, etc.

Model data 262 comprises data pertaining to one or more models. As an example, data pertaining to one or more models comprises relationships and associations between domains (e.g., top-level domains, subdomains, etc.) and address information such as IP addresses. Model data 262 can store information pertaining to one or more machine learning processes and/or configurations for the implementation of one or more machine learning processes to predict address information.

Predictive cache data 264 comprises address information that are predicted with respect to one or more domains. As an example, predictive cache data 264 stores predicted address information that was determined for one or more previous DNS queries.

Legacy cache data 266 comprises address information corresponding to previous queries sent to the aDNS. For example, in response to system 200 determining that a DNS query is safe or secure and that the target address information is to be obtained from an aDNS rather than from a prediction (e.g., via prediction module 245 using model module 235), legacy cache data 266 stores the address information obtained from the aDNS in association with the applicable DNS.

According to various embodiments, memory 220 comprises executing application data 275. Executing application data 275 comprises data obtained or used in connection with executing an application such as an application executing a machine learning process or for configuring a machine learning model. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious traffic, a document preparation application, a report preparation application, a user interface application, a data analysis application, an anomaly detection application, a user authentication application, etc.).

FIG. 3 is a diagram of a system for using a predictive cache in connection with responding to a Domain Name System (DNS) query. According to various embodiments, system 300 is implemented in connection with system 100 and/or system 200 of FIG. 2. In various embodiments, system 300 is implemented in connection with process 600 of FIG. 6, process 700 of FIG. 7, process 800 of FIG. 8, and/or process 900 of FIG. 9.

In the example shown in FIG. 3, traffic originates at infected client 310 and is sent to a DNS resolve 320. For example, infected client 310 communicates a DNS traffic (e.g., DNS query) to DNS resolver 320. As illustrated in FIG. 3, rather than sending the DNS traffic to a NDS tunneling server 340 such as in connection with querying an aDNS, DNS resolver 320 sends the traffic to predictive cache 350. For example, DNS resolver 320 determines to use predictive cache 350 to obtain a response to a DNS query sent from infected client 310. In some embodiments, DNS resolver 320 determines to use predictive cache 350 to obtain target address information that is responsive to the DNS query based at least in part on a determination that the DNS query communicated from infected client 310 corresponds to suspicious traffic or malicious traffic. In response to receiving a query from DNS resolver 320, predictive cache 350 determines (e.g., predicts) address information corresponding to the domain indicated by the query. In some embodiments, predictive cache 350 uses a machine learning model to predict address information corresponding to the domain. In response to determining the predicted address, predictive cache 350 returns to the infected client 310 (e.g., DNS resolver 320) the predicted address as target address information that is responsive to the DNS query.

Figure 4:
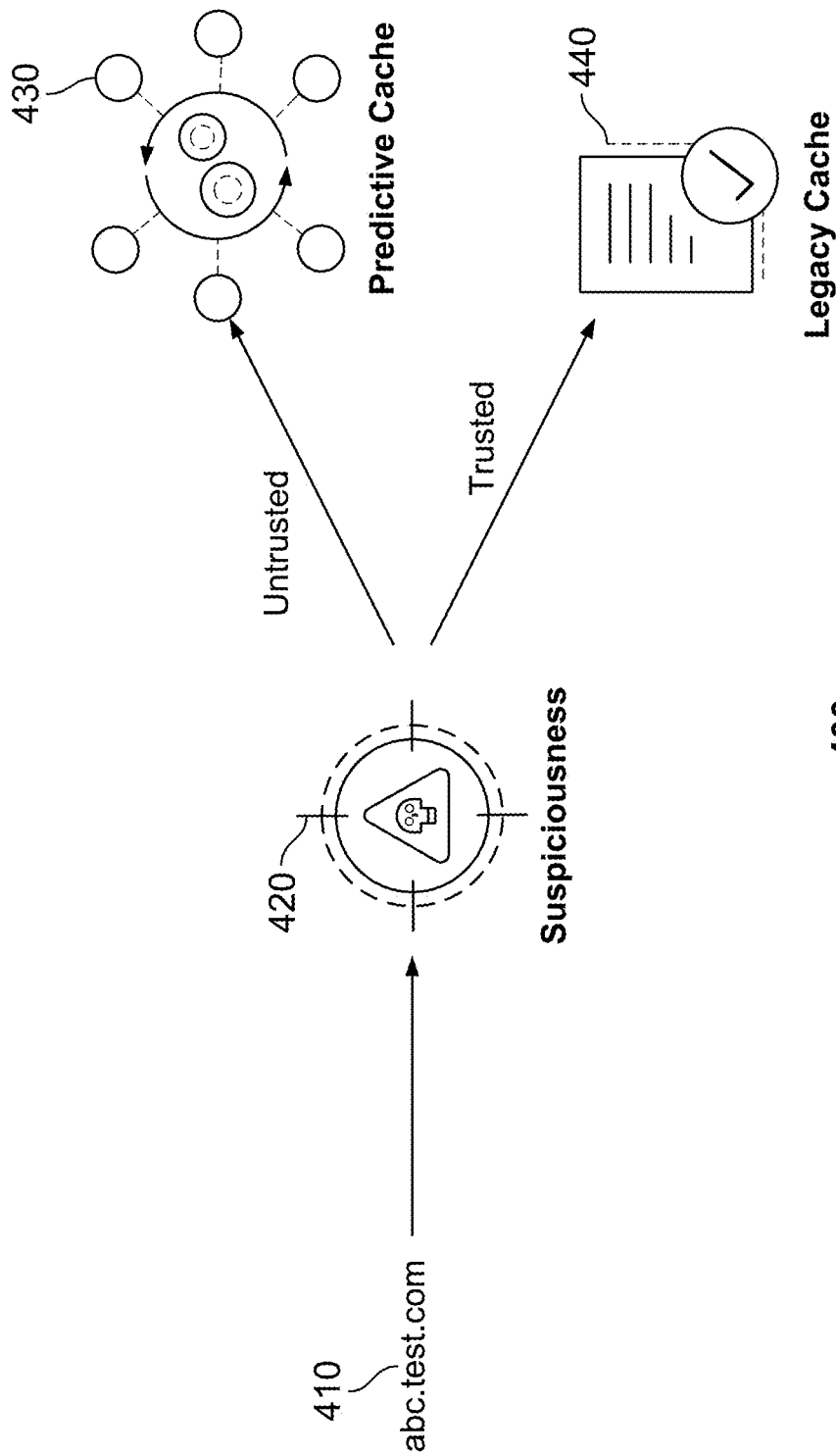
FIG. 4 is a diagram of a system for determining to use a predictive cache in connection with responding to a DNS query.

FIG. 4 is a diagram of a system for determining to use a predictive cache in connection with responding to a DNS query. According to various embodiments, system 400 is implemented in connection with system 100 and/or system 200 of FIG. 2. In various embodiments, system 400 is implemented in connection with process 600 of FIG. 6, process 700 of FIG. 7, process 800 of FIG. 8, and/or process 900 of FIG. 9.

In the example shown in FIG. 4, a DNS query 410 is communicated to a network such as to a DNS resolver. As an example, the DNS query 410 is communicated by a client (e.g., an infected or malicious client, a benign or secure client, etc.). A detector 420 receives the DNS query 410 and determines whether the DNS query corresponds to suspicious or malicious traffic. For example, the detector 420 determines whether the DNS query 410 corresponds to untrusted traffic or trusted traffic. In some embodiments, detector determines whether the DNS query 410 corresponds to untrusted traffic or trusted traffic based at least in part on an analysis of the DNS query 410 and/or the client from which the DNS query is received.

In response to detector 420 determining that the DNS query 410 corresponds to untrusted traffic, a query is sent to predictive cache 430 to obtain predicted address information for the domain comprised in the DNS query 410. In some embodiments, predictive cache 430 uses a machine learning model to predict address information corresponding to the domain. In response to determining the predicted address, predictive cache 430 returns to the predicted address as target address information that is responsive to the DNS query 410.

In response to detector 420 determining that the DNS query 410 corresponds to trusted traffic, a query is sent to legacy cache 440 to obtain predicted address information for the domain comprised in the DNS query 410. In some embodiments, legacy cache 440 determines a cached address information corresponding to the domain, and returns such cached address information as a target address information that is responsive to the DNS query 410. The cached address information can correspond to address information previously obtained from an aDNS. In response to determining the legacy cache 440 does not comprise address information mapped to the domain of the DNS query 410, a query is sent to an aDNS for address information corresponding to the domain, and in response to receiving the address information from the aDNS, the address information is returned as target address information that is responsive to the DNS query 410.

Figure 5:
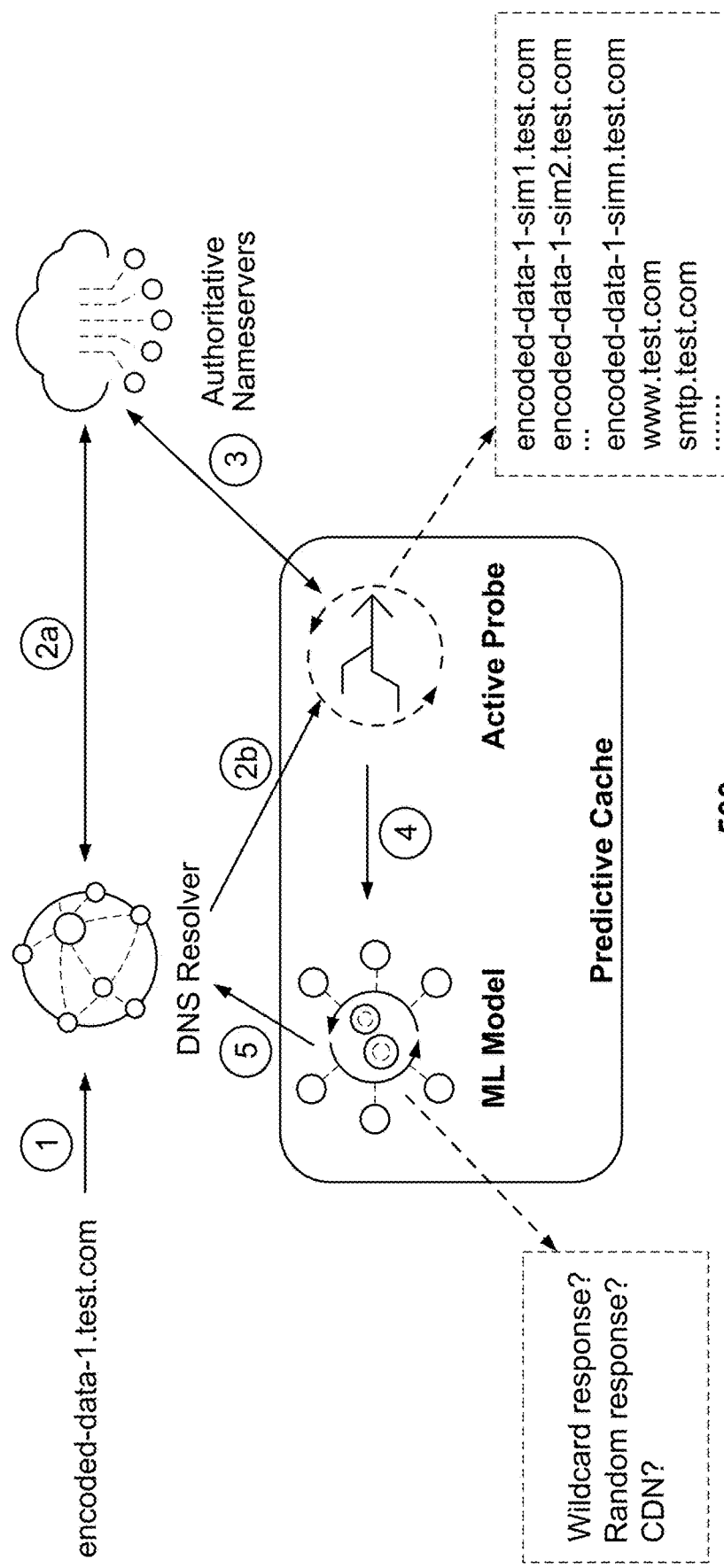
FIG. 5 is a diagram of a system for responding to a DNS query.

FIG. 5 is a diagram of a system for responding to a DNS query. According to various embodiments, system 500 is implemented in connection with system 100 and/or system 200 of FIG. 2. In various embodiments, system 500 is implemented in connection with process 600 of FIG. 6, process 700 of FIG. 7, process 800 of FIG. 8, and/or process 900 of FIG. 9.

In the example shown, the DNS resolver receives a DNS query at step 1 (e.g., a query directed to the encoded-data-1.test.com domain). In response to receiving the DNS query, DNS resolver determines whether the DNS query corresponds to trusted or untrusted traffic. For example, DNS resolver determines whether the DNS query corresponds to suspicious or malicious traffic.

In response to a determination that the DNS query corresponds to trusted traffic, at step 2a, the traffic is directed to a legacy cache or aDNS in order to obtain address information corresponding to the domain comprised in the DNS query (e.g., the encoded-data-1.test.com domain).

In response to a determination that the DNS query corresponds to untrusted traffic, at step 2b, the traffic is directed to a predictive cache to obtain a predicted address information.

In response to receiving a query for address information, at step 3, the predictive cache obtains from an aDNS one or more records pertaining to (e.g., adjacent to) the domain of the DNS query and/or list of previously resolved addresses associated with the top-level domain. In some embodiments, the predictive cache requests from an applicable passive DNS records for other subdomains of the top-level domain corresponding to the DNS query (e.g., past resolutions of the top-level domain are obtained). As an illustrative example, in the case of the top-level domain "root.com", predictive cache obtains all records for the subdomains under "root-.com" from the passive DNS. In some embodiments, the predictive cache determines a set of subdomains lexically similar to the domain comprised in DNS query, and queries the aDNS for address information corresponding to (e.g., mapped to) the set of subdomains lexically similar to the domain comprised in DNS query.

At step 4, the predictive cache provides to a machine learning model the address information obtained from the passive DNS, address information pertaining to a training set (e.g., address information for subdomains of various benign domains), and/or the address information corresponding to the set of subdomains lexically similar to the domain comprised in DNS query.

At step 5, the predictive cache uses a machine learning model to predict address information for the domain comprised in the DNS query. In some embodiments, the machine learning model is pre-trained based on a relationship among subdomains and domains and/or address information corresponding to previously resolved subdomains for a top-level domain. The machine learning model uses a machine learning process to predict address information (e.g., the IP address) for the domain comprised in the DNS query. In response to the machine learning model determining the predicted address information, the predictive cache provides the predictive address information as the target address information that is responsive to the DNS query. As an example, the predictive cache provides the predictive address information to the DNS resolver, which in turn provides such information as target address information to the client from which the DNS query originated.

Figure 6:
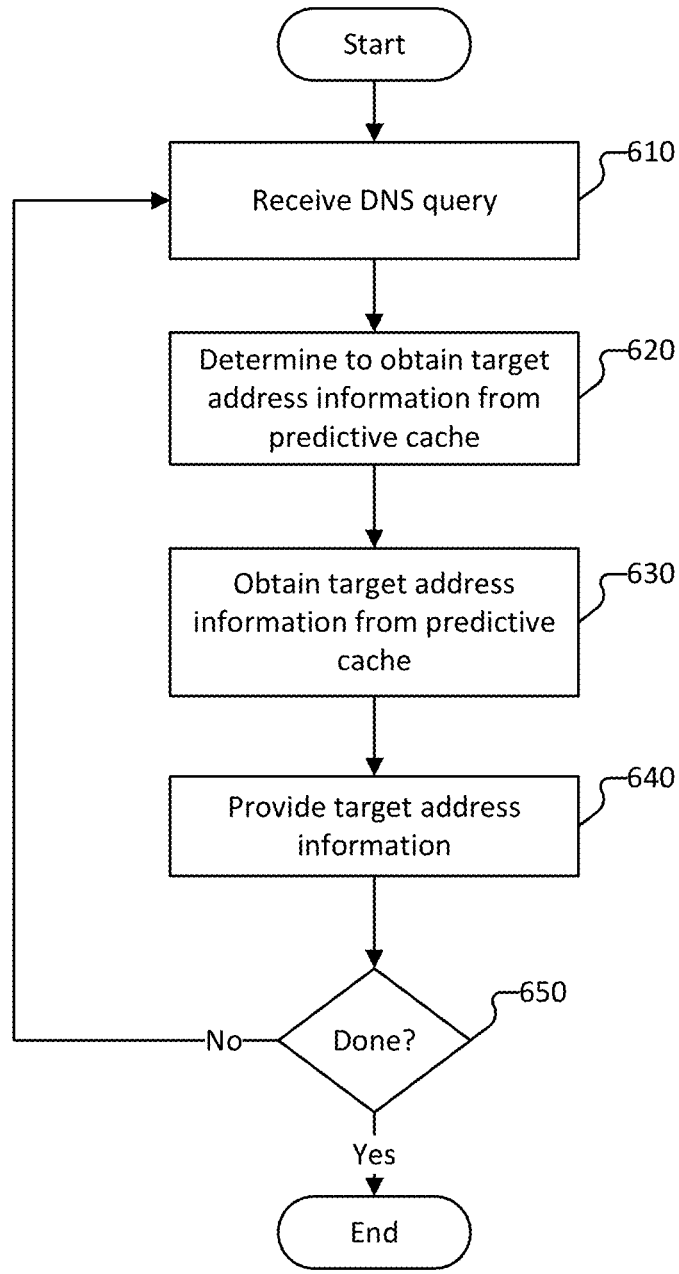
FIG. 6 is a flow diagram of a method for using a predictive cache in connection with responding to a DNS query.

FIG. 6 is a flow diagram of a method for using a predictive cache in connection with responding to a DNS query. According to various embodiments, process 600 is implemented in connection with system 100 of FIG. 1 and/or system 200 of FIG. 2.

At 610, a DNS query is received. In some embodiments, a system receives the DNS query from a client such as via a DNS resolver.

At 620, a determination to obtain target address information from a predictive cache. As an example, the target address information corresponds to an address that is responsive to the DNS query. In some embodiments, the system determines to obtain the target address information from the predictive cache based at least in part on a determination that the DNS query corresponds to untrusted traffic (e.g., a suspicious traffic, malicious traffic, etc.).

At 630, the target address information is obtained from the predictive cache. In some embodiments, the target address information corresponds to predicted address information such as a predicted IP address. For example, the predicted address information is estimated using a model such as a machine learning model. In some embodiments, the predicted address is estimated contemporaneous with the DNS query (e.g., in response to receiving the DNS query, the predicted cache estimates the predicted address). In some embodiments, the predicted address is obtained from storage such as in the case that address information corresponding to the domain being previously estimated.

At 640, the target address information is provided. In response to obtaining the target address information from the predictive cache, the target address information is communicated in response to the DNS query. For example, the system provides the target address information to the client from which the DNS query originated.

At 650, a determination is made as to whether process 600 is complete. In some embodiments, process 600 is determined to be complete in response to a determination that no further DNS traffic (e.g., DNS queries) is to be handled, an administrator indicates that process 600 is to be paused or stopped, etc. In response to a determination that process 600 is complete, process 600 ends. In response to a determination that process 600 is not complete, process 600 returns to 610.

Figure 7:
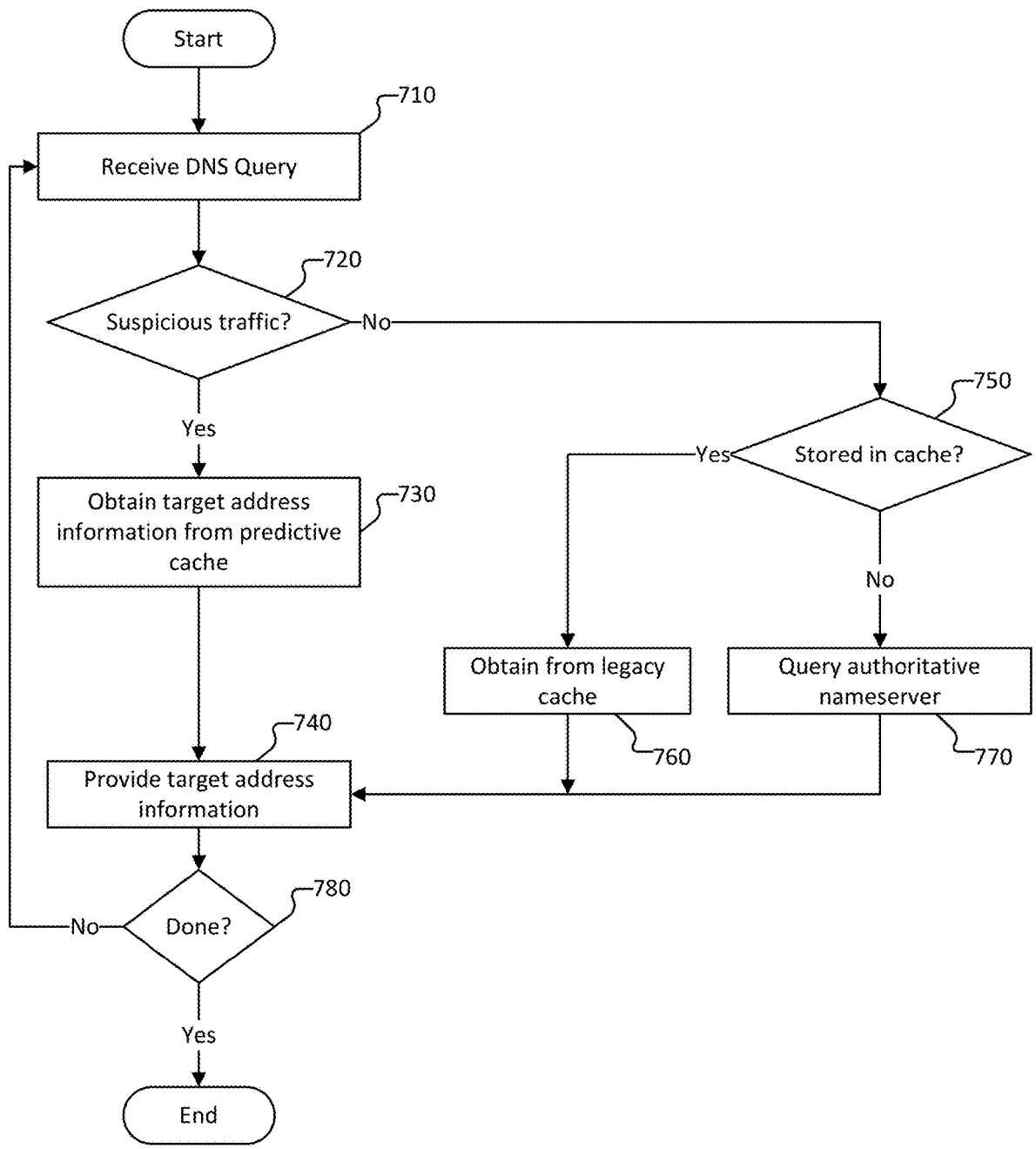
FIG. 7 is a flow diagram of a method for using a predictive cache in connection with responding to a DNS query.

FIG. 7 is a flow diagram of a method for using a predictive cache in connection with responding to a DNS query. According to various embodiments, process 700 is implemented in connection with system 100 of FIG. 1 and/or system 200 of FIG. 2.

At 710, a DNS query is received.

At 720, a determination is made as to whether the DNS query corresponds to suspicious traffic. In some embodiments, the system uses a detection module in connection with determining whether the DNS query is suspicious. As an example, the detection module determines whether the DNS query is suspicious based at least in part on one or more of a detection of an anomaly in the DNS traffic, a white list identifying trusted domains, a black list identifying untrusted domains, etc.

In response to a determination that the DNS query corresponds to suspicious traffic at 720, process 700 proceeds to 730 at which the target address information is obtained from the predictive cache. In some implementations, the obtaining the target information from the predictive cache is performed in the same or similar manner to 630 of process 600 of FIG. 6.

In response to a determination that the DNS query does not correspond to suspicious traffic at 720, process 700 proceeds to 50 at which the system determines whether a cache stores address information mapped to the domain comprised in the DNS query. In response to a determination that the address information mapped to the domain is stored in the cache at 750, process 700 proceeds to 760 at which the address information is obtained from a legacy cache and returned as target address information in response to the DNS query. In response to a determination that the address information mapped to the domain is not stored in the cache at 750, process 700 proceeds to 770 at which the authoritative nameserver (e.g., aDNS) is queried. For example, the system queries the aDNS for address information corresponding to the domain comprised in the DNS query. In response to receiving the address information corresponding to the domain, the system provides such information as target address information as responsive to the DNS query.

At 780, a determination is made as to whether process 700 is complete. In some embodiments, process 700 is determined to be complete in response to a determination that no further DNS traffic (e.g., DNS queries) is to be handled, an administrator indicates that process 700 is to be paused or stopped, etc. In response to a determination that process 700 is complete, process 700 ends. In response to a determination that process 700 is not complete, process 700 returns to 710.

Figure 8:
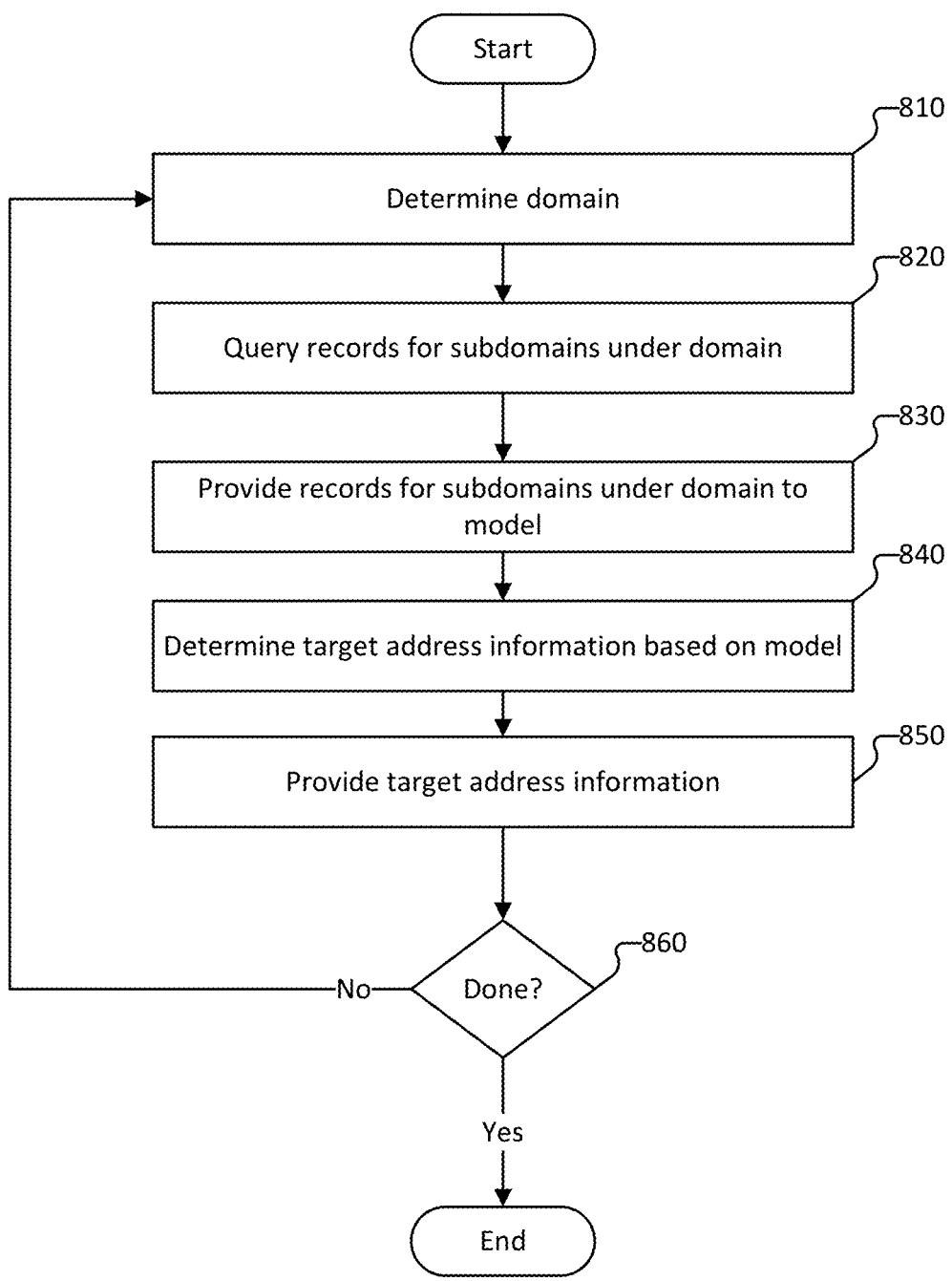
FIG. 8 is a flow diagram of a method for determining a target address information corresponding to a DNS query.

FIG. 8 is a flow diagram of a method for determining a target address information corresponding to a DNS query. According to various embodiments, process 800 is implemented in connection with system 100 of FIG. 1 and/or system 200 of FIG. 2.

At 810, a domain is determined. In some embodiments, the domain is comprised in DNS traffic such as a DNS query. As an example, a firewall or DNS resolver obtains the domain from the DNS traffic, and provides the domain to a predictive cache.

At 820, records for subdomains are queried. In some embodiments, the system determines a top-level domain associated with the domain (e.g., the top-level domain of the DNS query) and obtains records for subdomains of such top-level domain. According to various embodiments, the system obtains (i) a set of records under the top-level domain from the passive DNS (e.g., PDNS), and/or (ii) a set of records for a list of domains lexically similar subdomains from an aDNS. As an example with respect to (i), the system determines previously resolved address information for other subdomains associated with the top-level domain of the DNS query. As an example with respect to (ii), the system generates a list of domains that are similar to the subdomain comprised in the aDNS and queries the aDNS for corresponding address information.

At 830, the records for subdomains under the domain are provided to the model. The system provides the records for the subdomains to the model in connection with a request to obtain a predicted address. For example, the system provides to the model the previously resolved address information for other subdomains associated with the top-level domain of the DNS query previously resolved address information, and address information for domains that are similar to the domain comprised in the DNS query.

At 840, target address information is determined based at least in part on the model. In some embodiments, the model determines a predicted address corresponding to an estimate of the address information corresponding to the domain. As an example, the model is a machine learning model that implements a machine learning model to generate the predicted address. In some embodiments, the determining the predicted address comprises using the model in conjunction with one or more of (i) a set of records under the top-level domain from the passive DNS (e.g., PDNS), and/or (ii) a set of records for a list of domains lexically similar subdomains from an aDNS. In some embodiments, the model is trained using address information for a set of domains such as benign domains and corresponding sub-domains.

At 850, the target address information is provided. In response to obtaining the target address information (e.g., the predicted address estimated using the model), the target address information is communicated such as to a client in response to the DNS query. For example, the system provides the target address information to the client from which the DNS query originated.

At 860, a determination is made as to whether process 800 is complete. In some embodiments, process 800 is determined to be complete in response to a determination that no further address information needs to be determined for a domain, an administrator indicates that process 800 is to be paused or stopped, etc. In response to a determination that process 800 is complete, process 800 ends. In response to a determination that process 800 is not complete, process 800 returns to 810.

Figure 9:
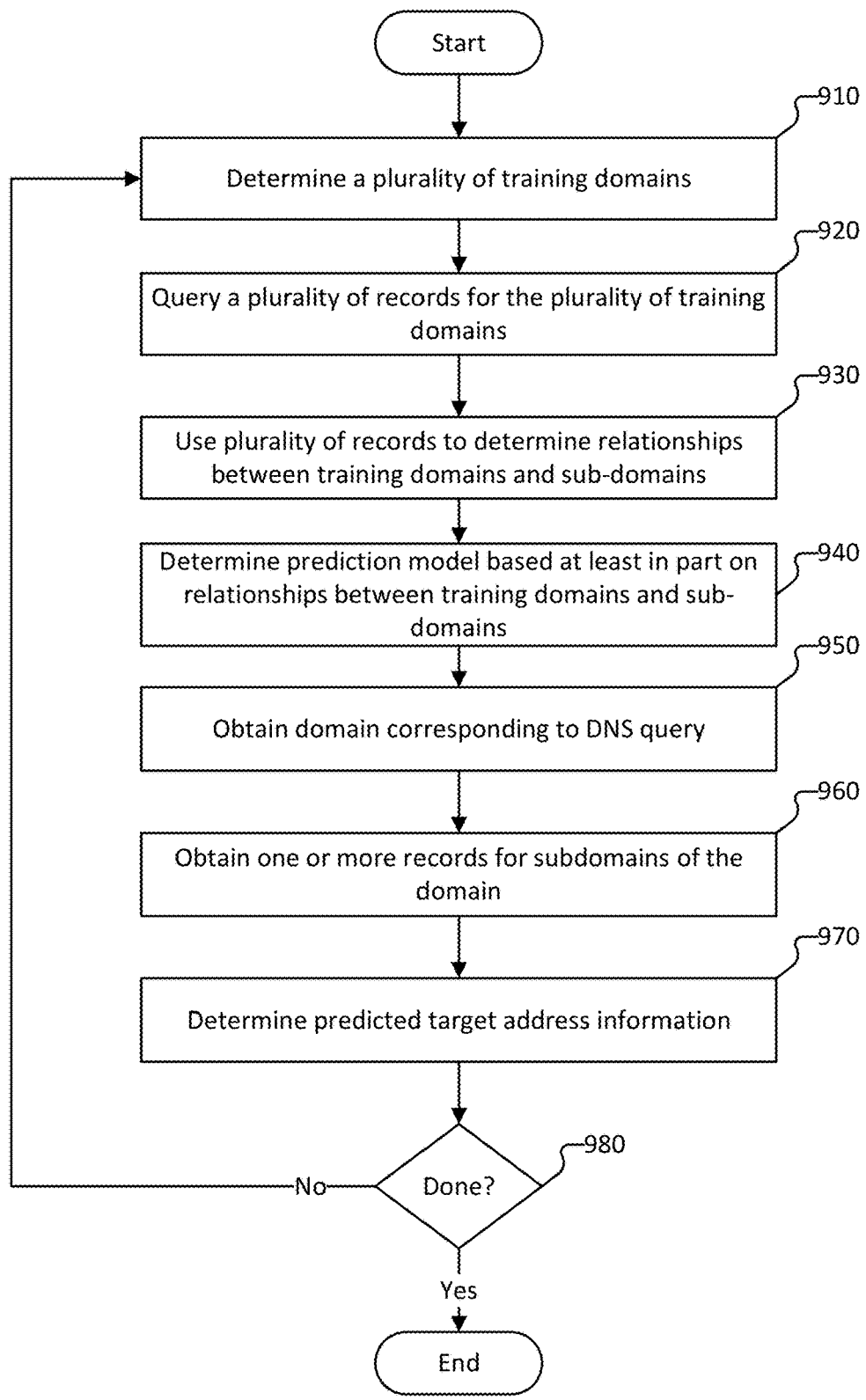
FIG. 9 is a flow diagram of a method for determining a machine learning model to predict a record structure associated with a domain.

FIG. 9 is a flow diagram of a method for determining a machine learning model to predict a record structure associated with a domain.

At 910, a plurality of training domains are determined. In some embodiments, the system determines set of domains such as benign domains and corresponding sub-domains. The set of domains and corresponding sub-domains can be determined based on a selection such as a selection or configuration by an administrator of a prediction system (e.g., a developer of the model), etc. As an example, the plurality of training domains correspond to domains deemed to be trusted or benign.

At 920, a plurality of records for the plurality of training domains are queried. In some embodiments, the system queries a set of previously resolved address information for address information mapped to the plurality of training domains and/or address information mapped to the plurality of training domains at the authoritative nameserver. For example, with respect to the set of previously resolved address information, the system queries the pDNS for the corresponding address information. As an example, with respect to address information stored at the authoritative nameserver, the system queries the applicable aDNS for address information corresponding to the plurality of training domains.

At 930, a plurality of records are used to determine relationships between training domains and sub-domains. In some embodiments, a machine learning process is used to relationships between training domains and sub-domains based at least in part on the plurality of records for the plurality of training domains. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model used in connection with estimating address information for a domain is trained using a set of training domains. The set of training domains may be pre-set.

At 940, a prediction model is determined based at least in part on relationships between training domains and sub-domains. In some embodiments, a machine learning process is used to determine the prediction model. The prediction model is determined to provide estimates of addresses for particular domains (e.g., prediction addresses).

At 950, a domain corresponding to a DNS query is obtained. In some embodiments, the domain is determined in a manner similar to 810 of process 800 of FIG. 8. For example, the domain is a top-level domain corresponding to the domain of the DNS query.

At 960, one or more records for subdomains of the domain are obtained. In some embodiments, the one or more records for the domains are obtained in a manner similar to 820 of process 800 of FIG. 8.

At 970, a predicted target address information is determined. In some embodiments, determining a predicted address information such as to be used as a target address information is performed in a manner similar to system 500 of FIG. 5, process 730 of process 700 of FIG. 7, and 830 and 840 of process 800 of FIG. 8.

At 980, a determination is made as to whether process 900 is complete. In some embodiments, process 800 is determined to be complete in response to a determination that no further address information needs to be determined for a domain, an administrator indicates that process 900 is to be paused or stopped, etc. In response to a determination that process 900 is complete, process 900 ends. In response to a determination that process 900 is not complete, process 900 returns to 910.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      receive an indication to obtain target address information for a domain;
      generate a predicted target address information for the domain query based at least in part on querying a machine learning model; and
      provide the predicted target address information as the target address information for the domain; and
   a memory coupled to the processor and configured to provide the processor with instructions;
   wherein: the one or more processors are further configured to: in response to receiving a DNS query, determine whether to obtain target information corresponding to the domain from a predictive cache; and the determining whether to obtain the target address information corresponding to the DNS query from the predictive cache comprises:

determining a query frequency for a domain associated with the DNS query is queried; and comparing the query frequency to a frequency threshold;

in response to determining the query frequency satisfies the frequency threshold, query a corresponding authoritative DNS server for the target address information;

in response to determining the query frequency does not satisfy the frequency threshold, determine to obtain the target address information from the predictive cache.

2. The system of claim 1, wherein: the one or more processors are further configured to: in response to receiving a DNS query, querying a predictive cache to obtain the predicted target information for the domain associated with the DNS query; and in response to determining that the predictive cache does not currently store the target address information, use the machine learning model to determine the predicted target address information; and the predicted target address information is provided to a client device.

3. The system of claim 1, wherein the machine learning model determines the predicted target address information without sending a received DNS query to an authoritative server corresponding to the domain associated with the DNS query.

4. The system of claim 1, wherein the using the machine learning model to determine a predicted target address information comprises: obtaining top-level domain information pertaining to the domain associated with a DNS query; and generating address information for one or more sub-level domains pertaining to the domain associated with the DNS query, wherein: address information for one or more sub-level domains is estimated based at least in part on the machine learning model.

5. The system of claim 4, wherein the top-level domain information is obtained based at least in part on querying a database that stores registered users or assignees of an Internet resource.

6. The system of claim 1, wherein the one or more processors are further configured to: in response to receiving a DNS query, query a predictive cache to obtain the predicted target information for the domain associated with the DNS query; and in response to determining that the predictive cache does not currently store the target address information, block the DNS query.

7. The system of claim 6, wherein: the DNS query is blocked based at least in part on a configuration set by an administrative user.

8. The system of claim 1, wherein the predicted target address information is stored in a predictive cache, and the predictive cache stores a set of target addresses that are estimated based at least in part on corresponding top-level domain information.

9. The system of claim 8, wherein records comprised in the predictive cache are generated using a machine learning process.

10. The system of claim 1, wherein in the event that the target address information provided in response to a DNS query is obtained from a predictive cache, the DNS query is not communicated to an authoritative server corresponding to a domain associated with the DNS query.

11. The system of claim 1, wherein: the one or more processors are further configured to: in response to receiving a DNS query, determine whether to obtain target information corresponding to the DNS query from a predictive cache; and determining whether to obtain target address information corresponding to the DNS query from the predictive cache comprises: determining whether the DNS query corresponds to suspicious traffic; and in response to determining that the DNS query corresponds to suspicious traffic, determining that the target address information is to be obtained from the predictive cache.

12. The system of claim 11, wherein the determining whether the DNS query corresponds to suspicious traffic comprises providing the DNS query to a suspicious traffic detector.

13. The system of claim 11, wherein the DNS query is determined to correspond to suspicious traffic based at least in part on whether a corresponding DNS is trusted or untrusted.

14. The system of claim 1, wherein the predictive cache is comprised in a DNS resolver.

15. The system of claim 1, wherein the predicted target address information is provided as the target address information for the domain in response to a DNS query.

16. A method, comprising:

receiving an indication to obtain target address information for a domain;

generating a predicted target address information for domain based at least in part on querying a machine learning model; and providing the predicted target address information as the target address information for the domain;

in response to receiving a DNS query, determining whether to obtain target information corresponding to the domain from a predictive cache; and the determining whether to obtain the target address information corresponding to the DNS query from the predictive cache comprises:

determining a query frequency for a domain associated with the DNS query is queried; and comparing the query frequency to a frequency threshold;

in response to determining the query frequency satisfies the frequency threshold, query a corresponding authoritative DNS server for the target address information;

in response to determining the query frequency does not satisfy the frequency threshold, determine to obtain the target address information from the predictive cache.

17. A computer program product embodied in a non-transitory computer readable medium and comprising computer instructions for:

receiving an indication to obtain target address information for a domain;

generating a predicted target address information for domain based at least in part on querying a machine learning model; and providing the predicted target address information as the target address information for the domain;

in response to receiving a DNS query, determining whether to obtain target information corresponding to the domain from a predictive cache; and the determining whether to obtain the target address information corresponding to the DNS query from the predictive cache comprises:

determining a query frequency for a domain associated with the DNS query is queried; and comparing the query frequency to a frequency threshold;

in response to determining the query frequency satisfies the frequency threshold, query a corresponding authoritative DNS server for the target address information;
in response to determining the query frequency does not satisfy the frequency threshold, determine to obtain the target address information from the predictive cache.

* * * * *